United States Patent [19]

Oike

[11] Patent Number: 4,776,305
[45] Date of Patent: Oct. 11, 1988

[54] EXHAUST TIMING CONTROL DEVICE FOR TWO-CYCLE ENGINES

[75] Inventor: Ikuo Oike, Saitama, Japan

[73] Assignee: Honda Giken Kogyo Kabushiki Kaisha, Tokyo, Japan

[21] Appl. No.: 52,658

[22] Filed: May 20, 1987

[30] Foreign Application Priority Data

May 20, 1986 [JP] Japan ................. 61-115687
Dec. 3, 1986 [JP] Japan ................. 61-286784

[51] Int. Cl.$^4$ ............................................. F02B 75/02
[52] U.S. Cl. ............................. 123/65 PE; 123/323
[58] Field of Search ............. 123/65 PE, 65 P, 65 V, 123/323

[56] References Cited

U.S. PATENT DOCUMENTS

| | | | |
|---|---|---|---|
| 4,121,552 | 10/1978 | Mithuo | 123/65 PE |
| 4,202,297 | 5/1980 | Oku | 123/65 PE |
| 4,325,335 | 4/1982 | Shibata | 123/323 |
| 4,333,431 | 6/1982 | Iio | 123/323 |
| 4,341,188 | 7/1982 | Nerstrom | 123/324 |
| 4,364,346 | 12/1982 | Shiohara | 123/323 |
| 4,388,894 | 6/1983 | Tanaka | 123/65 PE |
| 4,391,234 | 7/1983 | Holzleitner | 123/65 V |
| 4,399,788 | 9/1983 | Bostelmann | 123/323 |
| 4,494,506 | 1/1985 | Hayama | 123/348 |
| 4,516,540 | 5/1985 | Nerstrom | 123/65 PE |
| 4,541,371 | 9/1985 | Kageyama | 123/65 PE |
| 4,621,596 | 11/1986 | Uchinishi | 123/65 PE |
| 4,622,928 | 11/1986 | Uchinishi | 123/65 PE |
| 4,651,684 | 3/1987 | Masuda | 123/90.16 |
| 4,672,924 | 6/1987 | Hasa et al. | 123/65 PE |
| 4,672,925 | 6/1987 | Miyata et al. | 123/65 PE |

FOREIGN PATENT DOCUMENTS

| | | |
|---|---|---|
| 3232786A1 | 4/1984 | Fed. Rep. of Germany . |
| 47-36047 | 9/1972 | Japan . |
| 51-147813 | 5/1975 | Japan . |
| 51-21038 | 2/1976 | Japan . |
| 51-39112 | 3/1976 | Japan . |
| 51-42497 | 4/1976 | Japan . |
| 51-74623 | 6/1976 | Japan . |
| 51-147813 | 11/1976 | Japan . |
| 52-18333 | 4/1977 | Japan . |
| 52-132916 | 10/1977 | Japan . |
| 54-158514 | 12/1979 | Japan . |
| 55-160107 | 12/1980 | Japan . |
| 56-27014 | 3/1981 | Japan . |
| 56-47609 | 4/1981 | Japan . |
| 4636850 | 10/1981 | Japan . |
| 57-62917 | 4/1982 | Japan . |
| 57-105511 | 7/1982 | Japan . |
| 58-7059 | 2/1983 | Japan . |
| 58-7060 | 2/1983 | Japan . |
| 58-36818 | 8/1983 | Japan . |
| 59-7008 | 2/1984 | Japan . |
| 59-70029 | 5/1984 | Japan . |
| 59-105928 | 6/1984 | Japan . |

*Primary Examiner*—Charles J. Myhre
*Assistant Examiner*—David A. Okonsky
*Attorney, Agent, or Firm*—Lyon & Lyon

[57] ABSTRACT

A two-cycle engine having a cylinder, an exhaust port through the wall of the cylinder and an exhaust passage extending from the exhaust port with an exhaust timing control device located in the exhaust passage. The device includes a valve body which, in a first embodiment, is pivotally mounted in the exhaust passage and extends to the exhaust port. In a second embodiment, the valve body is fixed at one end and operates as a flexible resilient member to acheive variation in timing control. Each valve body is biased against a cam mechanism which may be rotated to actuate the valve body for controlling exhaust timing. The cam also provides a sealing mechanism between the valve body and the upper surface of the exhaust passage.

22 Claims, 7 Drawing Sheets

EXHAUST TIMING CONTROL DEVICE FOR TWO-CYCLE ENGINES

BACKGROUND OF THE INVENTION

The field of the present invention is devices for defining the timing edge on ports of two-cycle engines.

Two-cycle engines typically include one or more cylinders each having an exhaust port through the wall thereof and a piston slidably working within the cylinder so as to alternately expose and cover over the exhaust port. In such an arrangement, the opening and closing of the exhaust port by the piston is defined by the upper edge of the piston and the upper edge of the exhaust port.

Devices have been developed which include a valve mechanism defining an adjustable upper exhaust port edge. Typically the valve mechanism includes an element defining a timing edge. The element is adjustable in the axial direction of the cylinder responsive to engine speed. Two-cycle engines often have tuned exhausts such that a pressure wave generated with the opening of the exhaust port rebounds back to the port just prior to the closing of the exhaust port to compress exiting air/fuel mixture back into the combustion chamber. To utilize this phenomenon, the higher the engine speed, the sooner the exhaust valve must open and the later the exhaust valve must close. Naturally, the reverse is true for lower engine speeds.

The environment in which such exhaust timing control mechanisms operate is both demanding and adverse. Temperatures of the exhaust gases are high and the exhaust gases are dirty and tend to accumulate carbon materials in the components. The valve mechanism must also move rapidly and freely to reflect changing engine conditions and preferably provides a good seal between the timing edge and the cylinder wall above in order that effective timing control may be realized.

SUMMARY OF THE INVENTION

The present invention is directed to an exhaust timing control device for two-cycle engines employing a valve body capable of adjustably defining the timing edge of an exhaust port. The valve body is controlled by an actuating mechanism against which the valve body is resiliently biased. Rapid and effective movement may thus be achieved with a simple mechanism able to withstand the environment of the exhaust passage.

In a first aspect of the present invention, a cam mechanism located between the valve body and the top of the exhaust passage is employed to rapidly adjust the positioning of the valve body. The cam mechanism may provide appropriate sealing between the mechanism and the valve body and between the mechanism and the top of the exhaust passage so as to prevent substantial leakage from the combustion chamber between the valve body and the top of the exhaust passage. In this way, the valve body can more effectively define exhaust timing.

In another aspect of the present invention, the valve body is defined by a flexible plate member held fixed at the end most distant from the exhaust port. The valve body then acts to bias the mechanism toward one extreme timing position. The device is simplified through this construction and can be relatively lightweight for rapid response.

Accordingly, it is an object of the present invention to provide improved exhaust timing control mechanisms for two-cycle engines. Other and further objects and advantages will appear hereinafter.

BRIEF DESCRIPTION OF THE DRAWINGS

In the drawings, similar reference characters denote similar elements throughout the several views.

DETAILED DESCRIPTION OF THE PREFERRED EMBODIMENTS

Figure 1A:
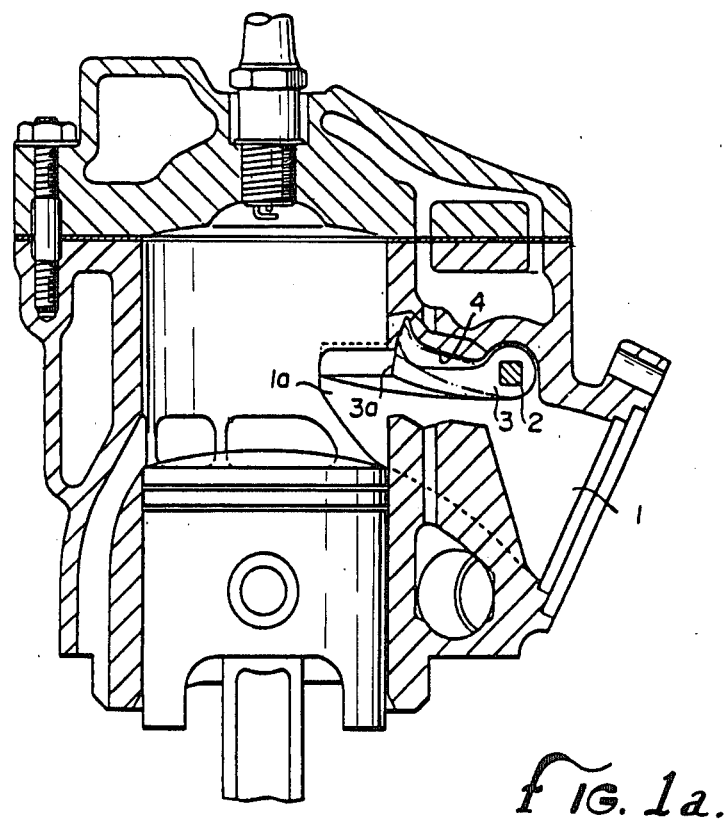
FIG. 1 is an exhaust timing control device not incorporating the present invention, FIG. 1(a) illustrating such a device in a cross-sectional elevation, FIG. 1(b) illustrating a detail of the valve body thereof.
Figure 1B:
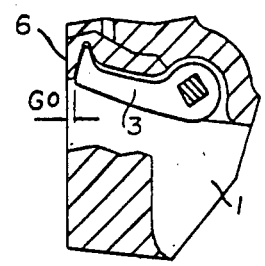
Figure 2:
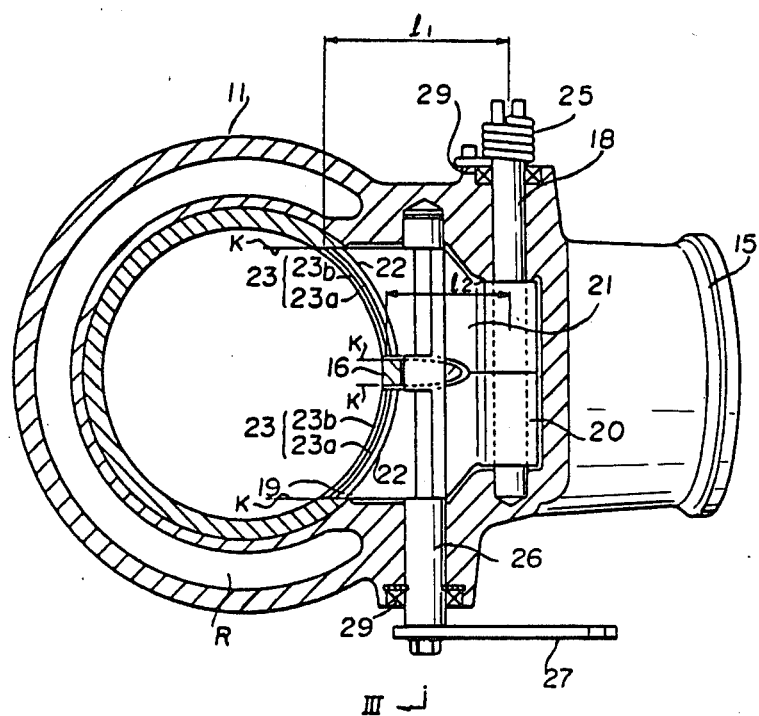
FIG. 2 is a cross-sectional plan view of a first embodiment of the present invention.
Figure 3:
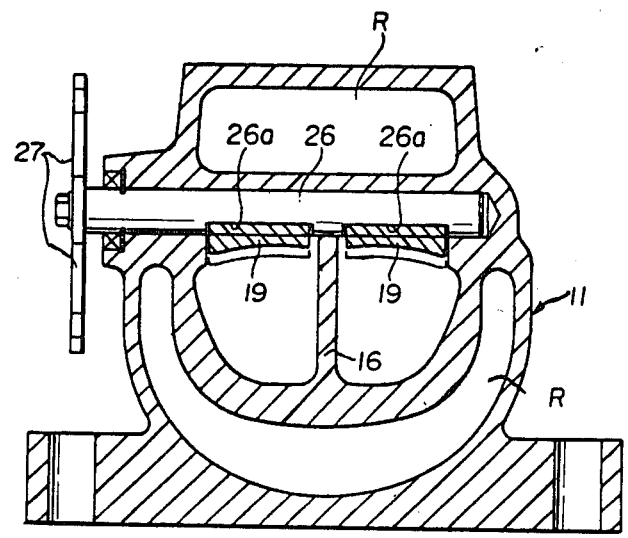
FIG. 3 is a cross-sectional elevation taken along line III—III of FIG. 2.

Turning in detail to the drawings, a device not incorporating the features of the present invention is illustrated in FIG. 1. This device is an illustration from Japanese Patent Application No. 60-121026 (121026/1985), the disclosure of which is incorporated herein by reference, which is presented to illustrate operation of such exhaust timing control devices. This exhaust timing control device is provided with a shaft 2 which is pivotally mounted about an axis lying in a plane to which the centerline of the cylinder is normal. The shaft 2 is located near an exhaust port 1a from which extends an exhaust passage 1. A plate-like valve body 3 is mounted to the shaft 2 to pivot integrally therewith.

The shaft 2, and in turn the valve body 3, is operatively controlled responsive to the running speed of the associated engine. When the engine is running at a low speed, the leading edge of the valve body 3 extends downwardly from the upper edge of the actual exhaust port 1a as shown in full line in the drawing. When the engine rotates at a higher speed, the valve body 3 is retracted into a recess 4 provided in the upper portion of the exhaust passage 1 as shown in phantom in FIG. 1(a). The effective edge of the exhaust port 1a is thereby moved up and down according to the speed of the engine. With the engine speed low, the valve body 3 is arranged to open the exhaust port later in the associated piston stroke and close the exhaust port earlier. With the engine at high rpm's, the valve body 3 is retracted and the reverse is true. Thus, a reflected wave in a tuned exhaust will better match the speed of the engine.

FIGS. 2 through 6 illustrate a first embodiment of the present invention. A cylinder block, generally designated 11, is illustrated in the several views. A cylinder head 12 is shown to be positioned on the cylinder block 11 to define, in association with a piston 13, a combustion chamber. The piston 13 slidably reciprocates within the cylinder 11 in conventional fashion. Transfer passages 14 are arranged in a suitable pattern about the cylinder wall. An exhaust passage 15 extends outwardly from the cylinder wall at an exhaust port 15a. The exhaust passage 15 is provided with a reinforcing rib 16 which extends from the surface of the cylinder. This rib 16 reinforces the cylinder wall at the exhaust port 15a and provides a surface upon which a piston ring on the piston 13 may ride.

A recess 17 is provided in the upper portion of the exhaust passage 15 from adjacent the exhaust port 15a. Adjacent one end of the recess 17 is a transverse shaft 18 which is pivotally mounted relative to the exhaust passage about an axis lying in a plane with which the centerline of the engine cylinder is normal. The portion of the shaft 18 which extends across the recess 17 is formed in a square section.

Fixed to the shaft 18 to integrally rotate therewith is a valve body 19. The valve body 19 is conveniently constructed of two pieces, right and left-hand symmetrical. The valve body 19 includes a mounting portion 20 through which the shaft 18 is inserted so as to be pivotally fixed relative to the valve body. A flat plate portion 21 extends from the mounting portion 20 toward the engine cylinder. A flange portion 22 is provided near the leading end of the flat plate portion 21. The flange portion operates to define the effective timing edge for the exhaust port.

Figure 6:
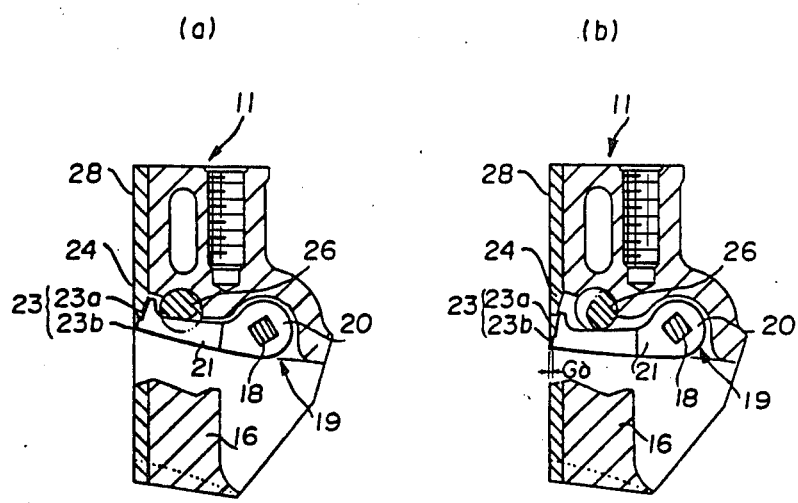
FIG. 6 is a cross-sectional elevation of the exhaust timing control device with FIG. 6(a) illustrating the device as seen in FIG. 5 and FIG. 6(b) illustrating the device as seen in FIG. 4.
Figure 7:
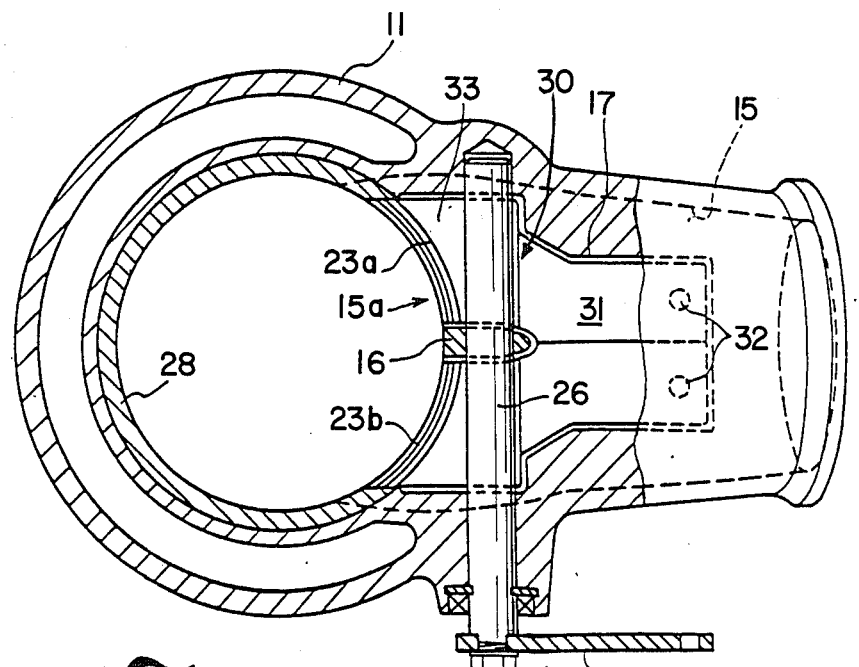
FIG. 7 is a cross-sectional plan view of a second embodiment of an exhaust timing control device of the present invention.
Figure 8:
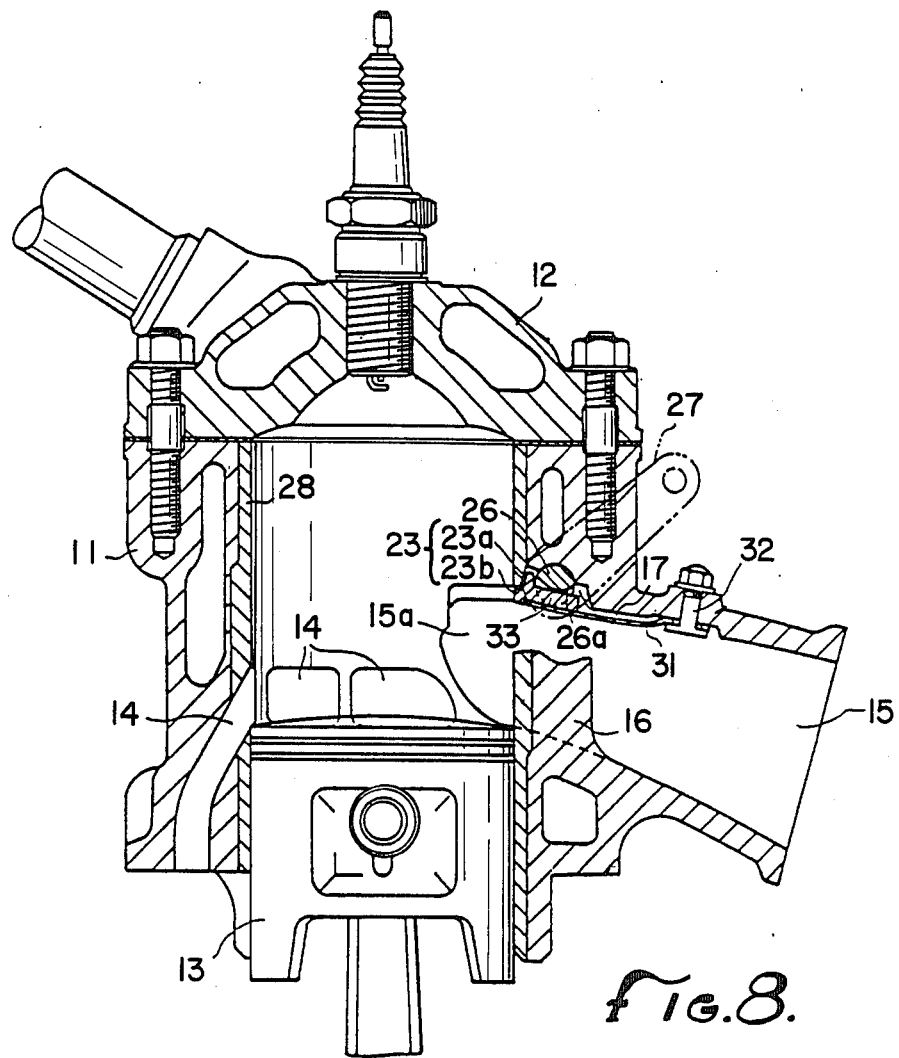
FIG. 8 is a cross-sectional elevation of the device of FIG. 7.
Figure 9:
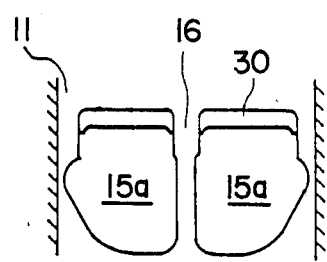
FIG. 9 is an elevation of the exhaust ports with the mechanism as illustrated in FIG. 8.
Figure 10:
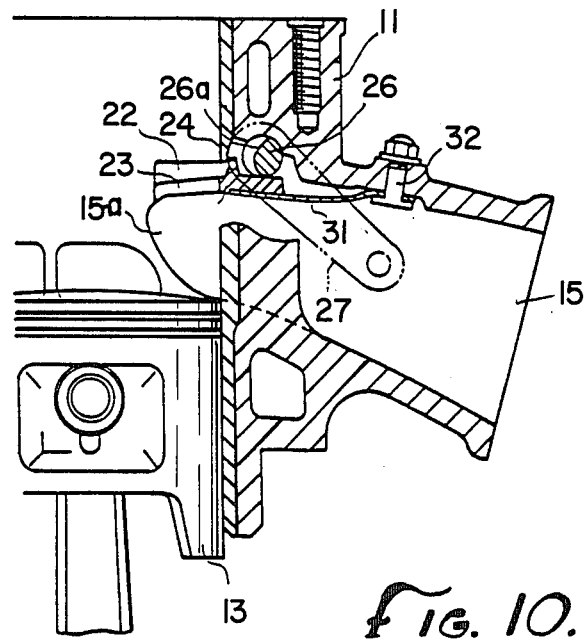
FIG. 10 is a detailed view as in FIG. 8 with the exhaust timing control device in a fully extended, lower position.
Figure 11:
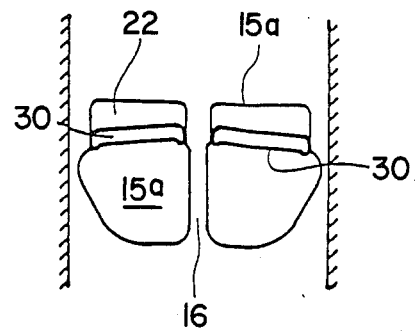
FIG. 11 is an elevation view of the exhaust ports of the device as illustrated in FIG. 10.

The valve body 19 includes a surface 23 at the flange portion 22 which is arranged toward the cylinder to act as a control surface to effectively define the upper timing edge of the exhaust port 15a. As the valve body 19 moves up and down with corresponding changes in engine speed, the surface 23 moves to adjust the effective timing of the engine. An upper side surface 23a of the control surface 23, as best seen in FIG. 6, is inclined upwardly and away from the cylinder so as to accommodate the recess 17. A lower side surface 23b is formed in an arched surface shape which is substantially identical to the curvature of the inner surface of the cylinder. The upper surface 23a is also arched to remain adjacent the lower surface 23b. An edge portion 24 extends downwardly as part of the cylinder. This edge portion in part operates to define the recess 17 into which the valve body 19 may retract.

Figure 4A:
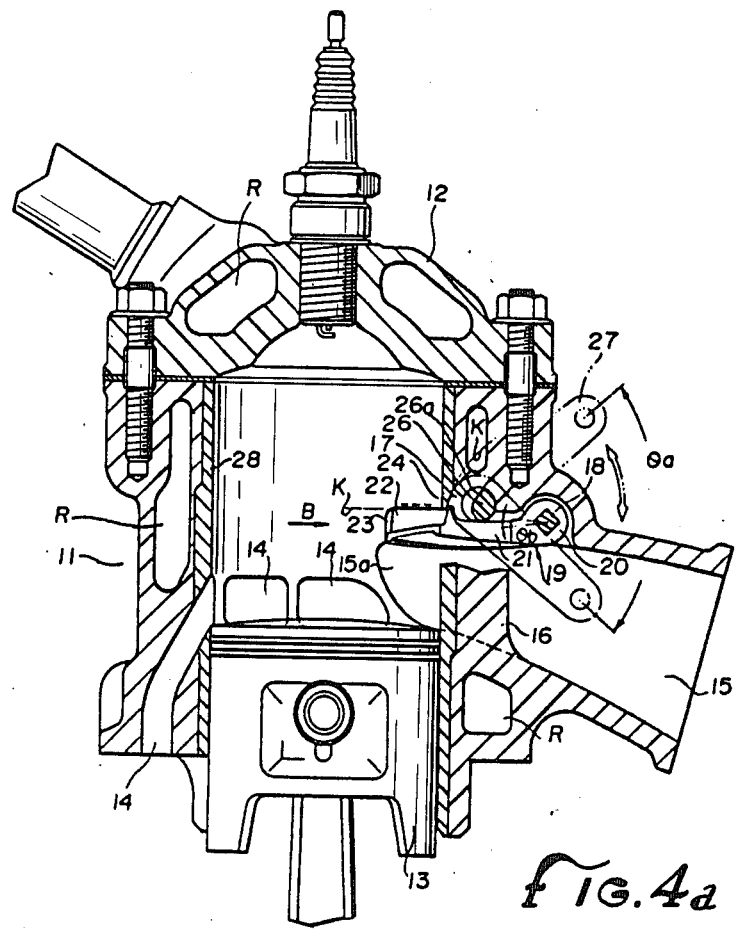
FIG. 4(a) is a cross-sectional elevation taken at right angles to the cross section of FIG. 3.
Figure 4B:
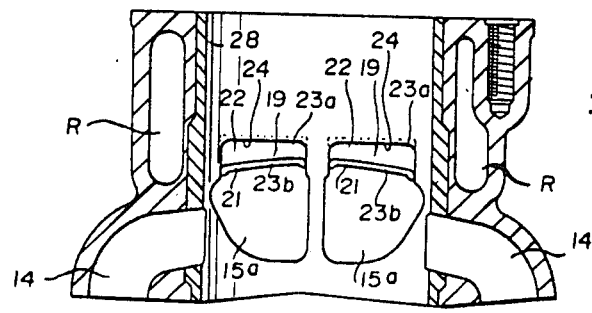
FIG. 4(b) is a cross-sectional elevation looking in the direction of B of FIG. 4(a).
Figure 5A:
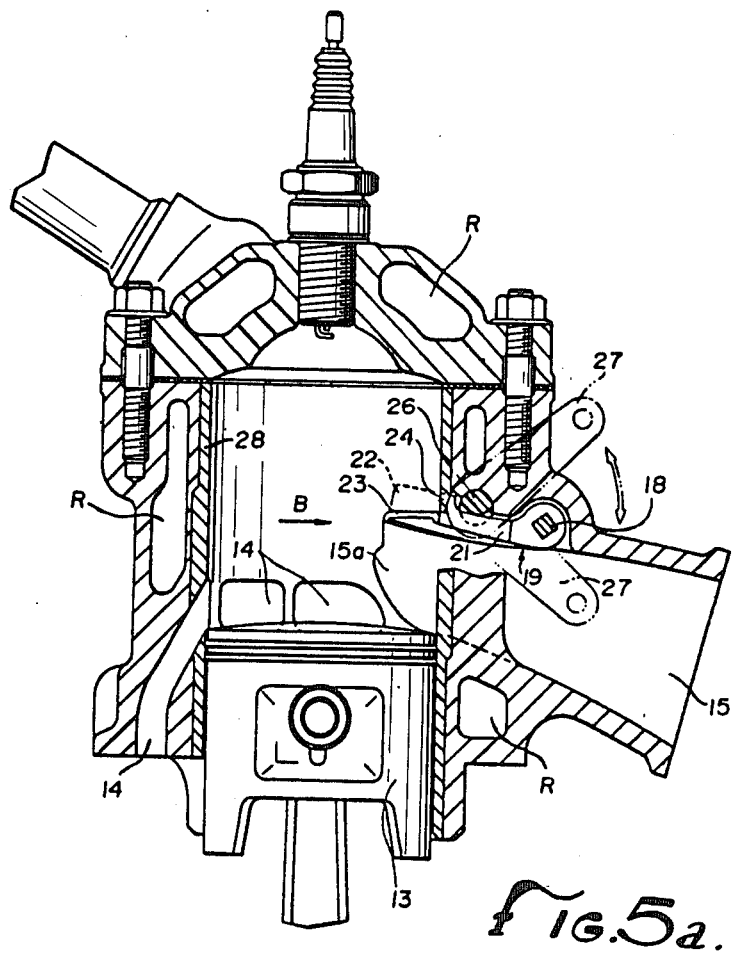
FIG. 5 illustrate the same views as FIG. 4 with the valve body in the retracted, upper position.
Figure 5B:
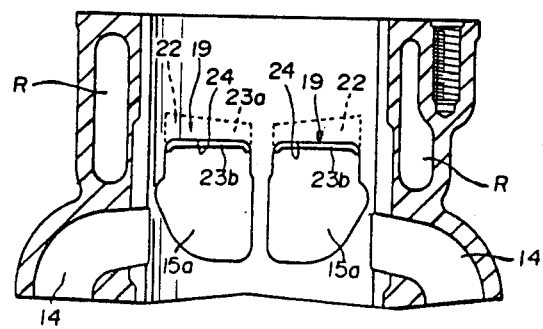

With the valve body 19 in the upper, retracted position, the lower control surface 23b is brought up against the upper edge portion 24 of the exhaust port 15a, as can be seen in FIG. 5(b). As there is some pivot radius differences between points on the control surface 23b (see FIG. 2, radius $l_1$ and radius $l_2$), when the valve body 19 is in its lower, extended position, the surfaces 23b extend downwardly as they extend about the cylinder from the central position. This is best illustrated in FIG. 4(b).

The flange portion 22 of the valve body 19 is formed to accommodate the foregoing result of the varying pivot radii. Consequently, the flange portion 22 has a greater height at each end thereof than it does at the center. By increasing the height outwardly from the center, the same overlap of the edge portion 24 by the flange portion 22 may be realized with the valve body 19 in its lower, fully extended position.

The sides of the flat plate portion 21 at the flange portion 22 are rounded downwardly as seen in FIG. 4(b) and FIG. 5(b). This arrangement is used to conform the flat plate 21 to the radius exhaust port 15a. The device is also arranged as can be seen to keep some uniformity of thickness for the valve body 19 in order to retain the appropriate mechanical and thermal properties.

One end of the shaft 18 supporting the valve body 19 extends outwardly from the cylinder block 11. On the projecting portion from the cylinder block 11 there is provided a spring 25 which biases the valve body 19 through the intermediary of the shaft 18. The valve body 19 is biased toward the retracted, upward position.

Located at the upper side of the valve body 19 and at the upper portion of the exhaust passage 15 is a cam 26 which is pivotally mounted in the cylinder block 11. The cam 26 is mounted parallel to the shaft 18. Provision is made in the upper wall portion of the exhaust passage 14 for the cam 26. The cam is exposed at its lower side into the exhaust passage 15 from the area in the exhaust passage wall formed for the receipt of the cam. The cam 26 is formed in a desired shape to define a control surface at a first portion 26a which is in contact with the upper surface of the valve body 19. A cylindrical shape is presented on the portion of the cam 26 which abuts against the upper wall of the exhaust passage 14.

One end of the cam 26 projects outwardly from the cylinder block 11 and has an arm 27 mounted thereto. The arm 27 operates to rotate the cam 26 to the desired position based on engine speed. Thus, a means for actuating the valve body 19 is provided.

The foregoing engine arrangement is shown in the present embodiment to include a cylinder sleeve 28. The cylinder sleeve 28 specifically defines the various ports. Outwardly of the sleeve in the block and in the head are coolant passages R. Sealing members 29 are also positioned in the engine block for the various shafts. The reference K illustrates machining work to be performed in properly preparing the device.

With the device thus constituted, exhaust timing control may be achieved. When the engine is being run at low speeds, the control surface 26a of the cam 26 addresses the upper surface of the valve body 19. At this time, the valve is biased at its upper surface against the control surface 26a. The orientation of the control surface 26a acts to lower the control surface 23 through the valve body 19 effecting a later opening and earlier closing of the exhaust port 15a. With the piston moving slowly, the open time for the exhaust port 15a is reduced such that the reflected wave in the exhaust returns to the port 15a immediately before the port is closed to increase the filling efficiency of the combustion chamber.

With the engine reaching high speed, the cam 26 is rotated through the intermediary of the arm 27 by means of the speed dependent actuator. A portion of the control surface of the cam is reduced from the base circle thereof. This portion is adapted to face the upper surface of the valve body 19 during high speed operation. The biasing of the spring 25 then moves the valve body 19 upwardly to the recess 17. As a result, the upper end of the exhaust port 15a is effectively higher.

Under the condition with the valve body 19 retracted upwardly, the exhaust port 15a is open earlier and closed later compared with the slow speed mode. Accordingly, the exhaust port 15a is open for a shorter period of time to accommodate the more rapidly moving piston such that the reflected wave of the exhaust continues to reach the exhaust port 15a immediately before the latter is closed. Again, the filling efficiency of the combustion chamber is improved.

The means for actuating the valve body 19 employed in this embodiment provides a seal to the passage of gases above the valve body itself. The cam 26 abuts against the upper surface of the valve body 19 across its width as well as abutting against the top of the exhaust passage 15 in its embedded position across the width thereof. Thus, a seal is effected between the valve body and the upper surface of the exhaust passage. Accordingly, with the valve body 19 in the extended, lower position, where the overlap between the edge portion 24 and the flange portion 22 is at a minimum, gas is prevented from leaking over the valve body 19. Such leakage reduces the effectiveness of the apparent upper timing edge of the exhaust port 15a as defined by the control surface 23.

The operation of the actuating means including the cam 26 provides substantial latitude in the operation of the associated actuator (not shown) in its response to engine speed. The surface of the cam 26 may be arranged to provide an appropriate opening as a function of the actuation of the arm 27. Accordingly, the rotating angle $\phi_a$ and speed of the arm 27 may operate in a first responsive relationship to the actuation mechanism. At the same time, the pivoting angle $\phi_b$ and the rotating speed of the valve body 19 may be freely set to define a second function relative to the actuating means as determined by the control surface 26a of the cam 26. Thus, conventional actuator mechanisms may be freely used with the foregoing device.

The control surface of the valve body 19 is shown to be formed in a step shape so as to project at the lower portion thereof. This allows the thickness of the edge portion 24 to be increased while retaining the clearance $G_1$, as seen in FIG. 6(b), as small as possible. This reduces the gas leakage which is an important factor in effecting exhaust timing control. The inability to make the clearance small when having a uniform arch shaped surface is illustrated in FIG. 1, with reference to $G_0$. By having the depending edge portion 24 thin, the clearance may be reduced. However, if the edge portion, reference 6 in FIG. 1, becomes too slender, it may become weak and subject to overheating and thermal stresses. Consequently, the extended portion on the control surface 23 is advantageous.

Since the present embodiment uses the valve body 19 having the control surface 23 with the step at its lower side, the thickness of the edge portion 24 of the cylinder can be set to provide sufficient strength and thermal characteristics. Simultaneously, the clearance between the control surface 23b and the inner surface projection of the cylinder can be set independently of the thickness of the edge portion 24. In this way, it is possible to simultaneously resolve two problems, the thickness of the edge portion 24 and the clearance G between the valve body 19 and the inner projected surface of the cylinder. As a result, the present embodiment may provide increased mechanical strength as well as thermal strength to the edge portion 24 with an efficient timing control device.

The employment of the sleeve 28 in the present embodiment also contributes to the proper control of gas leakage over the valve body 19. When direct casting is used to form the cylinder and recess 17, tolerances cannot be minimized. With a sleeve 28, the sleeve may be machined to the appropriate dimension. The engine block is then cast around the sleeve. In this way, advantageous tolerances may be achieved. The employment of the cam 26 also reduces leakage as stated above. Naturally, the cam may be arranged such that it simply abuts the upper wall of the exhaust passage 15 and still performs an adequate sealing function.

Thus, the exhaust timing control device of the first embodiment advantageously employs a valve body resiliently pivoted to a position in abutment with a cam. The cam provides the ability to have an optimum control surface for appropriately actuating the valve body and provides a sealing mechanism to more effectively control exhaust port timing.

Turning to the embodiment of FIGS. 7 through 11, an alternate valve body arrangement is illustrated. The valve body 30 includes a flexible resilient member 31. The flexible resilient member 31 operates as in the nature of a leaf spring. A first end portion of the valve body 30 is attached to the upper wall of the exhaust passage 15 by means of bolts 32. Extending toward the cylinder from the bolts 32, the valve body 30 also includes a valve member 33. The valve member 33 is shown to include the same features as the inner end of the valve body 19 in the prior embodiment. The cam mechanism 26 is shown to abut against the valve member 33 for actuation thereof.

The employment of the valve body 30 as in the embodiment of FIGS. 7 through 11 provides for inexpensive, reliable and lightweight components. Complexity is reduced in the adverse environment of the exhaust passage. The reduction in inertia may also allow the device to more accurately track the varying speeds of the engine. The flexible resilient member 31 also operates as a spring means for biasing the valve member 33 against the cam 26 even when the cam is in the position with the valve member retracted upwardly. As with FIGS. 4 and 5, FIGS. 8 through 11 illustrate the valve body 30 in both the upper, retracted operating position and lower, extended operating position.

Thus, two embodiments of exhaust timing control devices are illustrated which advantageously provide efficient timing control, advantageous construction and simplified structure and operation. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. An exhaust timing control device for a two-cycle engine having a cylinder, an exhaust port through the wall of the cylinder and an exhaust passage extending from the cylinder at the exhaust port, comprising
a valve body in the exhaust passage having a distal end which terminates adjacent to the exhaust port, said distal end being movable in the axial direction of the cylinder; and a cam pivotally mounted relative to and selectively extendible at least partially into the exhaust passage;

biasing means coupled to said valve body for biasing said valve body against said cam for selective movement of said valve body with pivotal movement of said cam.

2. The exhaust timing control device of claim 1 wherein said cam abuts against the top of the exhaust passage.

3. The exhaust timing control device of claim 2 wherein said cam is in sealing abutment with said valve body and in sealing abutment with the top of the exhaust passage.

4. The exhaust timing control device of claim 1 wherein said valve body is pivotally mounted relative to the exhaust passage about a pivot axis in a plane with which the axial direction of the cylinder is normal, said cam being in contact with said valve body between said pivot axis and said distal end of said valve body.

5. The exhaust timing control device of claim 4 wherein the pivot axis of said cam and the pivot axis of said valve body are substantially parallel.

6. The exhaust timing control device of claim 1, wherein said biasing means comprises a spring coupled with said valve body to bias said valve body against said cam.

7. The exhaust timing control device of claim 1 wherein said valve body includes a flexible plate member fixed at an end displaced from the exhaust port and terminating adjacent to the exhaust port.

8. The exhaust timing control device of claim 7 wherein said valve body further includes a valve member fixed at an end of said flexible plate member closest to the exhaust port.

9. The exhaust timing control device of claim 8 wherein said cam bears on said valve member.

10. The exhaust timing control device of claim 7 wherein said flexible plate member is in flexure to bias said valve body against said cam.

11. An exhaust timing control device for a two-cycle engine having a cylinder, an exhaust port through the wall of the cylinder and an exhaust passage extending from the cylinder at the exhaust port, comprising a valve body in the exhaust passage having a distal end which terminates adjacent to the exhaust port, said distal end being movable in the axial direction of the cylinder, said valve body including a flexible plate member fixed at a proximal end displaced from the exhaust port and extending toward the exhaust port; and a means for actuating said valve body operatively positioned above said valve body, said valve body being biased against said means.

12. The exhaust timing control device of claim 11 wherein said actuating means is in sealing abutment against said valve body and in sealing abutment with the top of the exhaust passage.

13. The exhaust timing control device of claim 11 wherein said valve body further includes a valve member fixed at an end of said flexible plate member closest to the exhaust port.

14. The exhaust timing control device of claim 13 wherein said actuating means bears on said valve member.

15. The exhaust timing control device of claim 11 wherein said flexible plate member is in flexure to bias said valve body against said actuating means.

16. An exhaust timing control device for a two-cycle engine having a cylinder, an exhaust port through the wall of the cylinder an an exhaust passage extending from the cylinder at the exhaust port, comprising a valve body in the exhaust passage having a distal end which terminates adjacent to the exhaust port, said distal end being movable in the axial direction of the cylinder;

a cam pivotally mounted on the upper side of and selectively extendible at least partially into the exhaust passage, said cam pivotable to a desired position based on engine parameters; and biasing means coupled to said valve body for biasing said valve body against said cam.

17. An exhaust timing control device for a two-cycle engine having a cylinder, an exhaust port through the wall of the cylinder and an exhaust passage extending from the cylinder at the exhaust port, comprising a valve body in the exhaust passage having a distal end which terminates adjacent to the exhaust port, said distal end being movable in the axial direction of the cylinder;

a cam pivotally mounted relative to the exhaust passage, said cam pivotable to a desired portion based on engine parameters; and biasing means secured directly to said valve body for biasing said valve body against said cam.

18. The control device of claim 17 wherein said biasing means comprises a flexible plate member.

19. The control device of claim 18 wherein said flexible plate member is in flexure to bias said valve body against said cam.

20. An exhaust timing control device for a two-cycle engine having a cylinder, an exhaust port through the wall of the cylinder and an exhaust passage extending from the cylinder at the exhaust port, comprising a valve body in the exhaust passage having a distal end which terminates adjacent to the exhaust port, said distal end being movable in the axial direction of the cylinder; and a cam pivotally mounted relative to and abutting against the top of the exhaust passage; and biasing means coupled to said valve body for biasing said valve body against said cam for selective movement of said valve body with pivotal movement of said cam.

21. An exhaust timing control device for a two-cycle engine having a cylinder, an exhaust port through the wall of the cylinder and an exhaust passage extending from the cylinder at the exhaust port, comprising a valve body in the exhaust passage having a distal end which terminates adjacent to the exhaust port, said distal end being movable in the axial direction of the cylinder; and a cam pivotally mounted relative to the exhaust passage;

biasing means coupled to said valve body for biasing said valve body against said cam for selective movement of said valve body with pivotal movement of said cam, said valve body pivotally mounted relative to the exhaust passage about a pivot axis in a plane with which the axial direction of the cylinder is normal, said cam being in contact with said valve body between said pivot axis and said distal end of said valve body.

22. An exhaust timing control device for a two-cycle engine having a cylinder, an exhaust port through the wall of the cylinder and an exhaust passage extending from the cylinder at the exhaust port, comprising a valve body in the exhaust passage having a distal end which terminates adjacent to the exhaust port, said distal end being movable in the axial direction of the cylinder, said valve body also including a flexible plate member fixed at an end displaced from the exhaust port and terminating adjacent to the exhaust port;

a cam pivotally mounted relative to the exhaust passage; and biasing means coupled to said valve body for biasing said valve body against said cam for selective movement of said valve body with pivotal movement of said cam.

* * * * *